Patented Nov. 18, 1930

1,781,789

UNITED STATES PATENT OFFICE

JOHN F. K. McCULLOUGH AND BENJAMIN W. GILCHRIST, OF DETROIT, MICHIGAN, ASSIGNORS TO TERNSTEDT MANUFACTURING COMPANY, OF DETROIT, MICHIGAN, A CORPORATION OF MICHIGAN

CHROMIUM PLATING

No Drawing. Application filed September 30, 1927. Serial No. 223,235.

This invention relates to chromium plating. It involves the use of an addition agent for the purpose of combining with the hydroxyl ions (OH ions) and preventing the precipitation of chromium hydroxide upon the cathode or work. We recommend the following formula:

Chromium chloride ($CrCl_3 6H_2O$) 300 grams per liter to saturation (cold)
Potassium chloride 250 grams per liter to saturation (cold)
Sodium chloride 250 grams per liter to saturation (cold)
Ammonium chloride 150 grams per liter to saturation (cold)
Sodium fluoride 3 to 5 grams per liter (cold)
Oxalic acid 75 to 100 grams per liter (cold)
Nitric acid 1%.

It will be evident, however, that our addition agent may be used in other baths where a similar condition prevails; that is, where the chromic ions combine with the hydroxyl ions to form chromic hydroxide, which precipitates upon the work in the form of a green scum.

We find that by the addition of aluminum chloride ($AlCl_3$) to a bath such as that above given, this precipitation of the chromic hydroxide is greatly minimized, if not wholly eliminated. As we understand it, the reaction is as follows:

During most electro-plating processes there is a large evolution of hydrogen at the cathode with an excess of hydroxyl ions. These hydroxyl ions react with the chromium salts or chromium chloride to produce green chromium hydroxide $CR(OH)_3$. This chromium hydroxide is practically insoluble at the usual hydrogen ion concentration (Ph) of the bath. The result is that this green chromium hydroxide is precipitated directly on the work in its insoluble form, leaving a green precipitate.

With our addition agent of aluminum chloride there is a reaction between the hydroxyl ions and the aluminum chloride instead of between the hydroxyl ions and the chromium chloride. This is because of the greater affinity of the addition agent for the hydroxyl ions. This reaction results in aluminum hydroxide. Aluminum hydroxide is not insoluble like chromium hydroxide but colloidal, and stays in the colloidal solution in the cathode film.

We have found that good results are obtained by the use of from 2 to 6 ounces of anhydrous aluminum chloride per gallon of solution. However, the cheaper hydrates in larger quantities may be substituted for the anhydrous salt. We prefer, however, to use three ounces of the anhydrous salt per gallon of solution.

What we claim is:

1. In a chromium chloride plating bath, the incorporation of an addition agent in said bath which combines with the hydroxyl ions for the purpose of preventing the deposit of chromium hydroxide on the work.

2. In a chromium chloride plating bath in which there is a tendency in the hydroxyl ions at the cathode to combine with the chromium ions to form a chromium hydroxide which precipitates on the work, the incorporation in said bath of an addition agent which has a greater affinity for the hydroxyl ions than the chromium compound, for the purpose of combining therewith and preventing the formation of chromium hydroxide.

3. In a chromium chloride plating bath, the incorporation in such bath of an addition agent which has a greater affinity for the hydroxyl ions than the chromium compound, and which will form with the hydroxyl ions a compound which will stay in colloidal solution.

4. In a chromium chloride plating bath including a chromium compound and in which there is a tendency of the hydroxyl ions liberated at the cathode to combine with the chromium compound to form a chromic hydroxide, the incorporation in said bath of an aluminum salt which has a greater affinity for the hydroxyl ions than the chromic compound and which combines with them to form an aluminum hydroxide that will stay in the solution.

5. In a chromium plating bath which includes chromic chloride and in which there is a tendency of the hydroxyl ions to combine with the chromic chloride to form a chromic hydroxide precipitate at the cathode, the incorporation in the bath of an addition agent, to wit: aluminum chloride.

In testimony whereof we have affixed our signatures.

JOHN F. K. McCULLOUGH.
BENJAMIN W. GILCHRIST.